United States Patent
Sahu et al.

(10) Patent No.: US 8,230,736 B2
(45) Date of Patent: Jul. 31, 2012

(54) LEVEL SENSOR FOR CONDUCTIVE LIQUIDS

(75) Inventors: Saroj Kumar Sahu, Mountain House, CA (US); Bruce Conway, La Honda, CA (US)

(73) Assignee: Deeya Energy, Inc., Fremont, CA (US)

( * ) Notice: Subject to any disclaimer, the term of this patent is extended or adjusted under 35 U.S.C. 154(b) by 0 days.

(21) Appl. No.: 12/577,147

(22) Filed: Oct. 9, 2009

(65) Prior Publication Data

US 2010/0094468 A1 Apr. 15, 2010

Related U.S. Application Data

(60) Provisional application No. 61/104,600, filed on Oct. 10, 2008.

(51) Int. Cl.
G01F 23/26 (2006.01)
G01F 23/24 (2006.01)

(52) U.S. Cl. .................... 73/304 R; 73/304 C
(58) Field of Classification Search ............... 73/304 R
See application file for complete search history.

(56) References Cited

U.S. PATENT DOCUMENTS

| | | | |
|---|---|---|---|
| 2,138,677 A | 11/1938 | Meyer | |
| 3,540,934 A | 11/1970 | Boeke | |
| 3,996,064 A | 12/1976 | Thaller | |
| 4,133,941 A | 1/1979 | Sheibley | |
| 4,159,366 A | 6/1979 | Thaller | |
| 4,284,951 A | 8/1981 | Dahl et al. | |
| 4,309,372 A | 1/1982 | Sheibley | |
| 4,312,735 A | 1/1982 | Grimes et al. | |
| 4,414,090 A | 11/1983 | D'Agostino et al. | |
| 4,454,649 A | 6/1984 | Jalan et al. | |
| 4,459,702 A * | 7/1984 | Medwin ................... | 377/24 |
| 4,468,441 A | 8/1984 | D'Agostino et al. | |
| 4,485,154 A | 11/1984 | Remick et al. | |
| 4,496,637 A | 1/1985 | Shimada et al. | |
| 4,543,302 A | 9/1985 | Gahn et al. | |
| 4,732,827 A | 3/1988 | Kaneko et al. | |
| 4,784,924 A | 11/1988 | Savinell et al. | |
| 4,814,241 A | 3/1989 | Nagashima et al. | |

(Continued)

FOREIGN PATENT DOCUMENTS

DE   102006007206   10/2006

(Continued)

OTHER PUBLICATIONS

Office Action for U.S. Appl. No. 12/217,059 mailed Aug. 23, 2010.

(Continued)

*Primary Examiner* — Hezron E Williams
*Assistant Examiner* — Paul West
(74) *Attorney, Agent, or Firm* — Haynes and Boone, LLP

(57) ABSTRACT

A sensor for measuring a level of a conductive liquid, is provided. The sensor includes at least two electrodes that can be positioned in a holding tank so as to be partially submerged in the conductive liquid, sensor leads coupled to the at least two electrodes, and circuitry and a controller for determining the properties of the electrolyte, the circuitry being coupled to the at least two electrodes via the sensor leads, and the controller being coupled to the circuitry. The sensor may be used as an electrolyte level sensor in a flow battery system.

26 Claims, 7 Drawing Sheets

U.S. PATENT DOCUMENTS

| | | | | |
|---|---|---|---|---|
| 4,828,666 | A | 5/1989 | Iizuka et al. | |
| 4,874,483 | A | 10/1989 | Wakabayashi et al. | |
| 4,879,902 | A * | 11/1989 | Loniello | 73/304 R |
| 4,882,241 | A | 11/1989 | Heinzel | |
| 4,894,294 | A | 1/1990 | Ashizawa et al. | |
| 4,929,325 | A | 5/1990 | Bowen et al. | |
| 4,945,019 | A | 7/1990 | Bowen et al. | |
| 4,948,681 | A | 8/1990 | Zagrodnik et al. | |
| 4,956,244 | A | 9/1990 | Shimizu et al. | |
| 5,061,578 | A | 10/1991 | Kozuma et al. | |
| 5,162,168 | A | 11/1992 | Downing et al. | |
| 5,188,911 | A | 2/1993 | Downing et al. | |
| 5,258,241 | A | 11/1993 | Ledjeff et al. | |
| 5,366,824 | A | 11/1994 | Nozaki et al. | |
| 5,626,053 | A * | 5/1997 | Williamson | 73/304 R |
| 5,648,184 | A | 7/1997 | Inoue et al. | |
| 5,656,390 | A | 8/1997 | Kageyama et al. | |
| 5,665,212 | A | 9/1997 | Zhong et al. | |
| 5,719,556 | A | 2/1998 | Albin et al. | |
| 5,759,711 | A | 6/1998 | Miyabayashi et al. | |
| 5,851,694 | A | 12/1998 | Miyabayashi et al. | |
| 6,005,183 | A | 12/1999 | Akai et al. | |
| 6,040,075 | A | 3/2000 | Adcock et al. | |
| 6,086,643 | A | 7/2000 | Clark et al. | |
| 6,242,125 | B1 | 6/2001 | Eidler et al. | |
| 6,461,772 | B1 | 10/2002 | Miyake et al. | |
| 6,475,661 | B1 | 11/2002 | Pellegri et al. | |
| 6,509,119 | B1 | 1/2003 | Kobayashi et al. | |
| 6,524,452 | B1 | 2/2003 | Clark et al. | |
| 6,555,267 | B1 | 4/2003 | Broman et al. | |
| 6,562,514 | B1 | 5/2003 | Kazacos et al. | |
| 6,692,862 | B1 | 2/2004 | Zocchi | |
| 6,759,158 | B2 | 7/2004 | Tomazic | |
| 6,761,945 | B1 | 7/2004 | Adachi et al. | |
| 6,764,789 | B1 | 7/2004 | Sekiguchi et al. | |
| 6,820,483 | B1 * | 11/2004 | Beckerman | 73/304 C |
| 6,905,797 | B2 | 6/2005 | Broman et al. | |
| 6,986,966 | B2 | 1/2006 | Clarke et al. | |
| 7,061,205 | B2 | 6/2006 | Shigematsu et al. | |
| 7,078,123 | B2 | 7/2006 | Kazacos et al. | |
| 7,199,550 | B2 | 4/2007 | Tsutsui et al. | |
| 7,220,515 | B2 | 5/2007 | Ito et al. | |
| 7,227,275 | B2 | 6/2007 | Hennessy et al. | |
| 7,343,798 | B1 | 3/2008 | Saracco | |
| 2003/0008203 | A1 | 1/2003 | Winter | |
| 2004/0170893 | A1 | 9/2004 | Nakaishi et al. | |
| 2004/0202915 | A1 | 10/2004 | Nakaishi et al. | |
| 2004/0241544 | A1 | 12/2004 | Nakaishi et al. | |
| 2004/0246658 | A1 | 12/2004 | Adrianov et al. | |
| 2005/0074653 | A1 | 4/2005 | Broman et al. | |
| 2005/0156431 | A1 | 7/2005 | Hennessy | |
| 2005/0156432 | A1 | 7/2005 | Hennessy | |
| 2005/0158615 | A1 | 7/2005 | Samuel et al. | |
| 2005/0164075 | A1 | 7/2005 | Kumamoto et al. | |
| 2005/0181273 | A1 | 8/2005 | Deguchi et al. | |
| 2005/0260473 | A1 | 11/2005 | Wang | |
| 2007/0072067 | A1 | 3/2007 | Symons et al. | |
| 2007/0080666 | A1 | 4/2007 | Ritter et al. | |
| 2007/0111089 | A1 | 5/2007 | Swan | |
| 2008/0081247 | A1 | 4/2008 | Nakaishi et al. | |
| 2008/0193828 | A1 | 8/2008 | Sahu | |
| 2009/0218984 | A1 | 9/2009 | Parakulam | |
| 2010/0003586 | A1 | 1/2010 | Sahu | |
| 2010/0090651 | A1 | 4/2010 | Sahu | |
| 2010/0092757 | A1 | 4/2010 | Nair | |
| 2010/0092807 | A1 | 4/2010 | Sahu | |
| 2010/0092813 | A1 | 4/2010 | Sahu | |
| 2010/0092843 | A1 | 4/2010 | Conway | |
| 2010/0094468 | A1 | 4/2010 | Sahu | |
| 2010/0136455 | A1 | 6/2010 | Winter | |
| 2010/0143781 | A1 | 6/2010 | Keshavarz | |

FOREIGN PATENT DOCUMENTS

| | | |
|---|---|---|
| JP | 60047373 | 3/1985 |
| JP | 60070672 | 4/1985 |
| JP | 60115174 | 6/1985 |
| JP | 1060967 | 3/1989 |
| JP | 1320776 | 12/1989 |
| JP | 2027667 | 1/1990 |
| JP | 2027668 | 1/1990 |
| JP | 3017963 | 1/1991 |
| JP | 8007913 | 1/1996 |
| JP | 10012260 | 1/1998 |
| JP | 10208766 | 8/1998 |
| JP | 11329474 | 11/1999 |
| JP | 2000058099 | 2/2000 |
| JP | 2000200619 | 7/2000 |
| JP | 2002015762 | 1/2002 |
| JP | 2002175822 | 6/2002 |
| JP | 2002289233 | 10/2002 |
| JP | 2002367661 | 12/2002 |
| JP | 2003173812 | 6/2003 |
| JP | 2005142056 | 6/2005 |
| JP | 2005228622 | 8/2005 |
| JP | 2005228633 | 8/2005 |
| JP | 2005322447 | 11/2005 |
| JP | 2006114360 | 4/2006 |
| JP | 2006147306 | 6/2006 |
| JP | 2006147376 | 6/2006 |
| JP | 2006313691 | 11/2006 |
| JP | 2006351346 | 12/2006 |
| JP | 2007087829 | 4/2007 |
| WO | 8905528 | 6/1989 |
| WO | WO9003666 | 4/1990 |
| WO | 03005476 | 1/2003 |
| WO | 2004079849 | 9/2004 |
| WO | 2006135958 | 12/2006 |

OTHER PUBLICATIONS

Office Action for U.S. Appl. No. 12/577,137 mailed Sep. 7, 2010.

Final Office Action for U.S. Appl. No. 12/577,127 mailed Aug. 19, 2010.

International Preliminary Report on Patentability and Written Opinion for related PCT Application No. PCT/US2009/060287, dated Apr. 21, 2011.

Search Report for PCT Application No. PCT/US2009/049285, Aug. 31, 2009.

Search Report for PCT Application No. PCT/US2009/060287, Nov. 18, 2009.

* cited by examiner

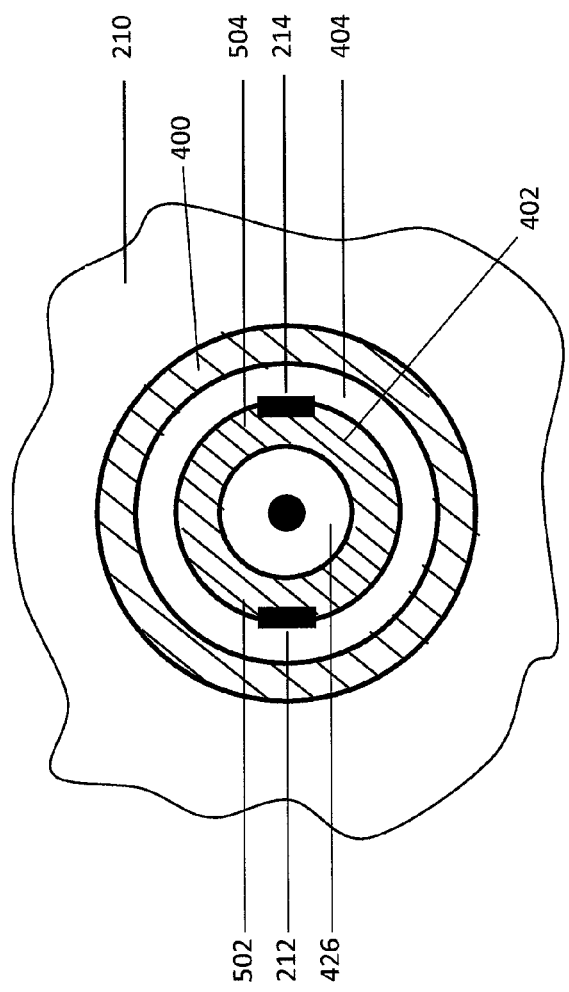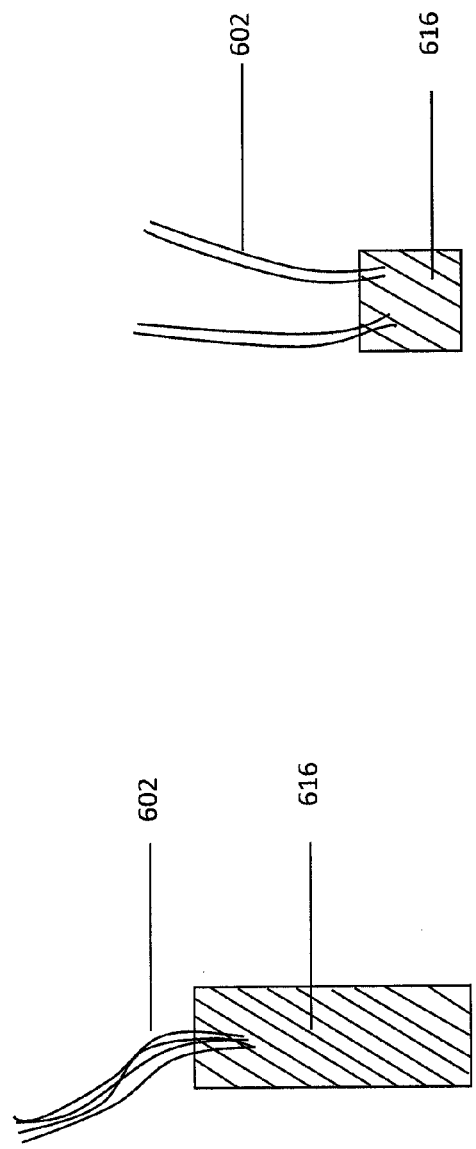

LEVEL SENSOR FOR CONDUCTIVE LIQUIDS

CROSS-REFERENCE TO RELATED APPLICATIONS

The present application claims benefit under 35 U.S.C. §119(e) of U.S. Provisional Application No. 61/104,600 filed on Oct. 10, 2008, entitled "Sensor For Measuring Fluid Level," the content of which is hereby incorporated by reference in its entirety.

BACKGROUND

1. Technical Field

Embodiments consistent with the present invention are related to conductive liquid sensors. In particular, some embodiments consistent with the present invention are related to measuring a level of an electrolyte in a holding tank of a flow battery system.

2. Discussion of Related Art

Fluids in a system often have important dynamic properties which are important to the overall operation of a system. Accordingly, sensors have been developed which measure these dynamic properties to monitor the state of the system. One such system is a reduction-oxidation (redox) flow battery system.

A redox flow battery is an electrochemical storage device in which an electrolyte containing one or more dissolved electro-active species flows through a reactor cell where chemical energy is converted to electrical energy. Conversely, the discharged electrolyte can be flowed through a reactor cell such that electrical energy is converted to chemical energy. Electrolyte is stored externally, for example in tanks, and flowed through a set of cells where the electrochemical reaction takes place. Externally stored electrolytes can be flowed through the battery system by pumping, gravity feed, or by any other method of moving conductive liquid through the system. The reaction in a flow battery is reversible. The electrolyte can be recharged without replacing the electroactive material. Hence, the energy capacity of a redox flow battery is related to the total electrolyte volume (i.e., the size of the storage tank). Electrolytes in the system have a constantly changing level, which may need to be monitored.

Capacitive-type level sensors are one type of sensor. Capacitive-type sensors require an RF excitation, and do not have any conductive contact with the electrolyte. Resistive-type level sensors are another type of sensor. Typical resistive-type level sensors measure the level of the electrolyte or other conductive liquid by monitoring the resistance of the conductive liquid. However, conventional resistive-type sensors can only measure whether or not an electrolyte is at a predetermined level. Moreover, resistive-type sensors typically use highly metallic electrodes, which quickly corrode in the corrosive electrolyte, resulting over time, in inaccurate measurements. Furthermore, capacitive and resistive electrolyte level sensors typically are only capable of measuring a level, such that flow battery systems require additional sensors for determining other parameters such as the temperature of an electrolyte.

There is therefore a need for a conductive liquid-level sensor that is able to withstand a corrosive environment and provide an accurate measurement of the level of a conductive liquid.

SUMMARY

Consistent with the present invention, a level sensor that measures a level of a conductive liquid in a holding tank is presented. The level sensor includes at least two electrodes, the two electrodes being positioned in the holding tank, sensor leads coupled to the at least two electrodes; and circuitry coupled to the sensor leads to determine a resistance between the sensor leads.

A method for measuring a level of a conductive liquid in a holding tank consistent with embodiments of the present invention include applying a current through at least two electrodes positioned in the holding tank such that they are partially immersed in the conductive liquid, measuring a resistance between the at least two electrodes, determining a length of the at least two electrodes not immersed in the conductive liquid based on the resistance; and determining the level of the conductive liquid in the holding tank from the length.

These and other embodiments of the present invention are further described below with reference to the following figures.

BRIEF DESCRIPTION OF THE DRAWINGS

In order to more fully understand the present invention, reference is made to the accompanying drawings, with the understanding that these drawings are not intended to limit the scope of the invention.

FIG. 5 illustrates a cross-sectional view of the sensor of FIG. 4, taken along lines IV-IV'.

FIGS. 6A and 6B illustrate an end portion of an electrode of the sensor shown in FIG. 4 consistent with some embodiments of the present invention.

In the figures, elements having the same designation have the same or similar function. The figures are illustrative only and relative sizes and distances depicted in the figures are for convenience of illustration only and have no further meaning.

DETAILED DESCRIPTION

In the following description, for the purposes of explanation, specific details are set forth in order to provide a thorough understanding of the embodiments of the invention. However, it will be apparent that the invention may be practiced without these specific details.

Some embodiments consistent with the present invention may provide a reliable way to measure a level of an electrolyte, or other conductive liquid, in a tank, without the introduction of any unwanted metals, dangerous electrical current, or other external materials or forces which affect the operation of the system. Some embodiments consistent with the present invention may also provide a location for a temperature sensor for measuring the temperature of an electrolyte or other conductive liquid.

Figure 1:
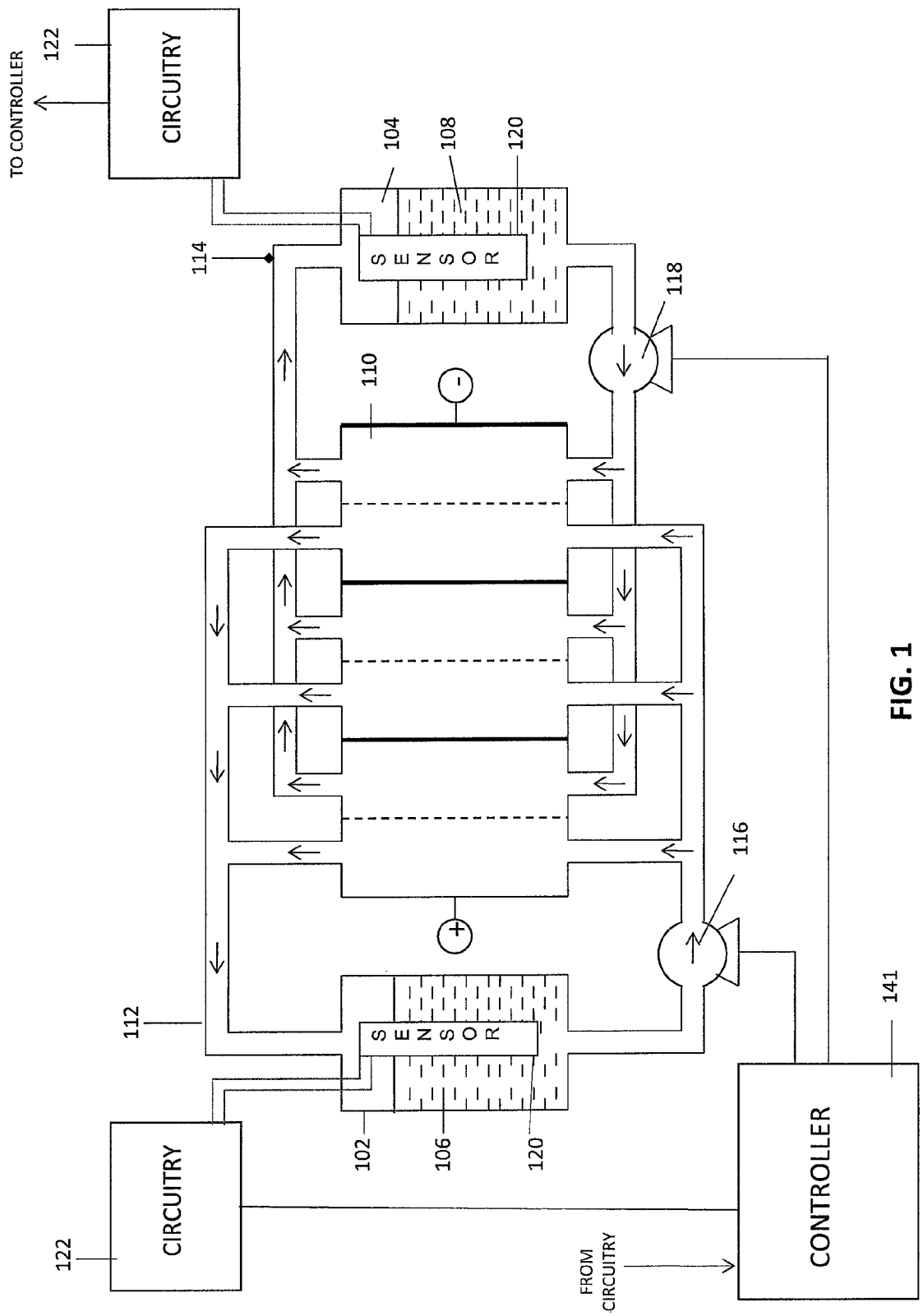
FIG. 1 illustrates a flow battery system in accordance with aspects of the present invention.

FIG. 1 illustrates a flow battery system 100 in accordance with aspects of the present invention. As shown in FIG. 1, flow battery system 100 includes storage tanks 102 and 104 for storing fluids 106 and 108, respectively, and a cell stack 110. Cell stack 110 as shown in FIG. 1 illustrates a three-cell stack, however in general cell stack 110 may include any number of individual cells. Fluids 106 and 108 are battery electrolytes, where one of conductive liquid 106 or conductive liquid 108 is an anolyte and the other is a catholyte. Conductive liquid 106 and conductive liquid 108 are distributed through cell stack 110 by distribution systems 112 and 114, respectively. In some embodiments, distribution systems 112 and 114 can include pumps 116 and 118, respectively, that are used to flow fluids 106 and 108 from holding tanks 102 and 104, respectively, through cell stack 110.

As shown in FIG. 1, a sensor 120 can be placed in each of storage tanks 102 and 104 to monitor fluids 106 and 108. In some embodiments consistent with the present invention, sensor 120 in storage tank 102 can be utilized to measure the level of conductive liquid 106 in storage tank 102. Additionally, sensor 120 in storage tank 104 can be utilized to measure the level of conductive liquid 108 in storage tank 104.

As shown in FIG. 1, sensor 120 may be coupled to circuitry 122. Although FIG. 1 illustrates an embodiment where sensor 120 in tank 102 and sensor 120 in tank 104 are each coupled to separate circuitry 122, in some embodiments both sensor 120 in tank 102 and sensor 120 in tank 104 can be coupled to a single circuit 122. Circuitry 122 may be external to system 100, or may be included within system 100. Circuitry 122 can be coupled to a controller 141. In accordance with aspects of the present invention, controller 141 may include a control circuit, logic, a separate external computer, a processor, and the like. Moreover, controller 141 may include multiple processors embedded on a single chip. In accordance with aspects of the present invention, controller 141 receives signals output from circuitry 122 and processes the signals to calculate, for example, a level of conductive liquid 106 or 108 in storage tank 102 or 104. Consistent with some embodiments of the present invention, circuitry 122 may have a high impedance, and may include an isolation circuit in order to electrically isolate circuitry 122 from electrolytic fluids 106 and 108.

In some embodiments, controller 141 receives level measurement information and other system information, and controls pumps 116 and 118 and other system components. Cell stack 110 can include porous membranes that separate the positive and negative electrolytes 106 and 108. During the operation of the system and due to systematic and random variations in pressure drop in the cell stack 110, there may be cross flow through the membrane resulting in changes in the conductive liquid levels in tanks 102 and 104. Differences in conductive liquid levels between the tanks 102 and 104 reduce the efficiency and capacity of system 100. The level sensor 120 is used to continuously monitor the conductive fluid levels in the tanks 102 and 104, and depending on the difference in the levels, the controller 141 controls pumps 116 and 118 in such a way as to equalize the conductive fluid levels in the tanks 102 and 104 in a closed loop fashion.

Figure 2:
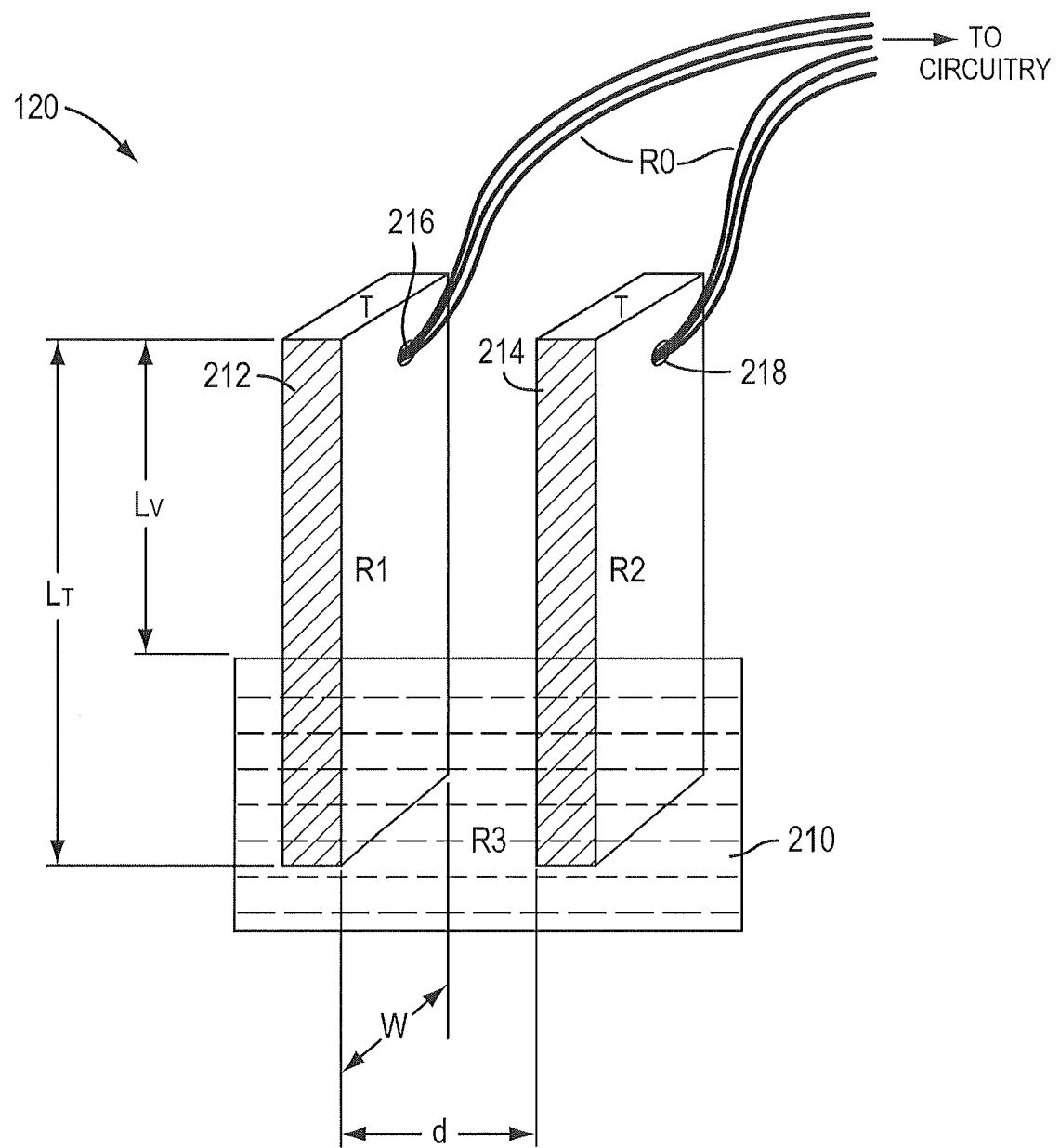
FIG. 2 illustrates a level sensor consistent with some embodiments of the present invention.

FIG. 2 illustrates an embodiment of sensor 120 consistent with the present invention. As shown in FIG. 2, sensor 120 includes a first electrode 212 and a second electrode 214 separated by a distance d. Leads 216 and 218, which are bonded to electrodes 212 and 214, respectively, provide electrical contact with circuitry 122.

In some embodiments, electrode 212 and electrode 214 are flat rails separated by a distance d. The electrodes can be of any size, for example electrodes 212 and 214 may have a width W of about 20-40 mm, a thickness T of about 1-10 mm, and an overall length $L_T$ of about 1-100 cm. Electrodes 212 and 214 may be formed from any material having a moderate resistivity that can withstand submersion in electrolytic conductive liquid 210, which is one of fluids 106 or 108 shown in FIG. 1. In some embodiments, electrodes 212 and 214 may be formed from a bipolar polyethylene material loaded with carbon, with an electrical resistivity of about 5-8 Ω-cm.

The level of conductive liquid 210 with respect to electrodes 212 and 214 can be determined by measuring the resistance of sensor 120. To measure the resistance of sensor 120, a current can be flowed through the length L.sub.U of electrodes 212 and 214 that is not submerged in (or are uncovered by) conductive liquid 210 and through conductive liquid 210. As such, the total resistance R can be given by $$R = R1 + R2 + R3 + R0,$$

where R1 is the resistance of the portion of electrode 212 that is not submerged in (or is uncovered by) conductive liquid 210, R2 is the resistance of the portion of electrode 214 that is not submerged in (or is uncovered by) conductive liquid 210, R3 is the resistance of conductive liquid 210 between electrodes 212 and 214, and R0 is total the termination resistance of leads 216 and 218 with electrodes 212 and 214, respectively. The value of R0 is a known constant, or can be determined for each individual sensor 120. Usually, R0 is designed to be much smaller than R1+R2+R3, so that R0's contribution to R is negligible. Hence, R can be given by $$R = R1 + R2 + R3,$$

The resistance R1 and R2 are given by $$R_{electrode} = \frac{\rho L_U}{TW}$$

where $R_{electrode}$ is either R1 or R2, $L_U$ is the length of electrode 212 or electrode 214 that is not immersed in conductive liquid 210, T is the thickness of electrode 212 or 214, W is the width of electrode 212 or 214, and ρ is the resistivity of electrodes 212 or 214.

If electrodes 212 and 214 are identical, having the same length $L_U$ that is not submerged in (or is uncovered by) conductive liquid 210 and having the same resistivity, width, and thickness, then R1=R2. The total resistance R across sensor 120 is then given by $$R = 2\frac{\rho L_U}{TW} + R3.$$

In some embodiments, the dimensions of electrodes 212 and 214 are such that R1+R2>>R3. R3 is a function of the resistivity of the liquid. Accordingly, R3<<R. Therefore, R3 may be considered to be negligible and conductive liquid 210 viewed as providing a direct short between electrode 212 and electrode 214. Thus, the total resistance R across sensor 120 may be approximated by $$R = 2\frac{\rho L_U}{TW}.$$

Figure 8A:
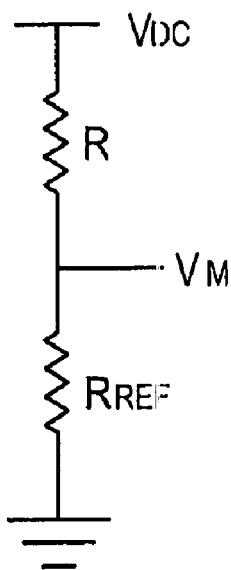
FIG. 8A-B illustrate resistor circuits consistent with embodiments of the present invention.

The resistance R can be measured in a number of ways. As shown in FIG. 8A, one method is to use a reference resistor $R_{REF}$, flow a DC current through $R_{REF}$ using voltage $V_{DC}$, and measure a voltage $V_m$, where $$V_m = \frac{R_{REF}}{R + R_{REF}} V_{DC}.$$

However, most conducting liquids generate gasses or undergo chemical changes in the presence of an electric field. Typically, conducting fluids have a chemical potential against the electrode material, below which no direct current (DC) current will flow and above which gas will be generated, making the resistance measurement erroneous. For example, if the conductive liquid is water with sodium sulfate dissolved in it, no substantial current will flow through the circuit shown in FIG. 8A until voltage $V_{DC}$ is above about 1.3 V. Above about 1.3 V, parasitic evolution of $H_2$ and $O_2$ will take place at the electrodes making the R measurement erroneous. Thus, the effects described above render the resistance measurement by Ohm's law inapplicable.

Figure 8B:
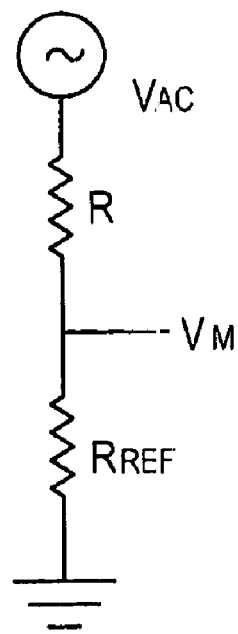

In order to measure R, embodiments of the present invention apply an alternating current (AC) voltage $V_{AC}$ of sufficient frequency across the circuit of FIG. 8B, such that the electrochemical potential is bypassed and gasses are not generated. In some embodiments, the frequency of the AC voltage $V_{AC}$ is greater than 80 Hz, preferably above 400 Hz and less than 200 KHz. In some embodiments of the present invention, the shape of the AC excitation voltage $V_{AC}$ is such that the time-integrated current through $R_{REF}$ is substantially the same for both positive and negative cycles. The AC voltage $V_{AC}$, for example, can have a magnitude of 5 VAC and be a square wave. The value of $R_{REF}$ can be selected to be the middle of the range of values that R is expected to take.

Consistent with embodiments of the present invention, sensor 120 is rigidly positioned within holding tank 102 or holding tank 104, as illustrated in FIG. 1. Therefore, after determining the length $L_U$ of electrodes 212 and 214 that is not immersed in conductive liquid 210, the level of conductive liquid in the tank can be determined. In some embodiments, $L_U$ can be subtracted from a known value to determine the level of conductive liquid 210 in the tank.

Figure 3:
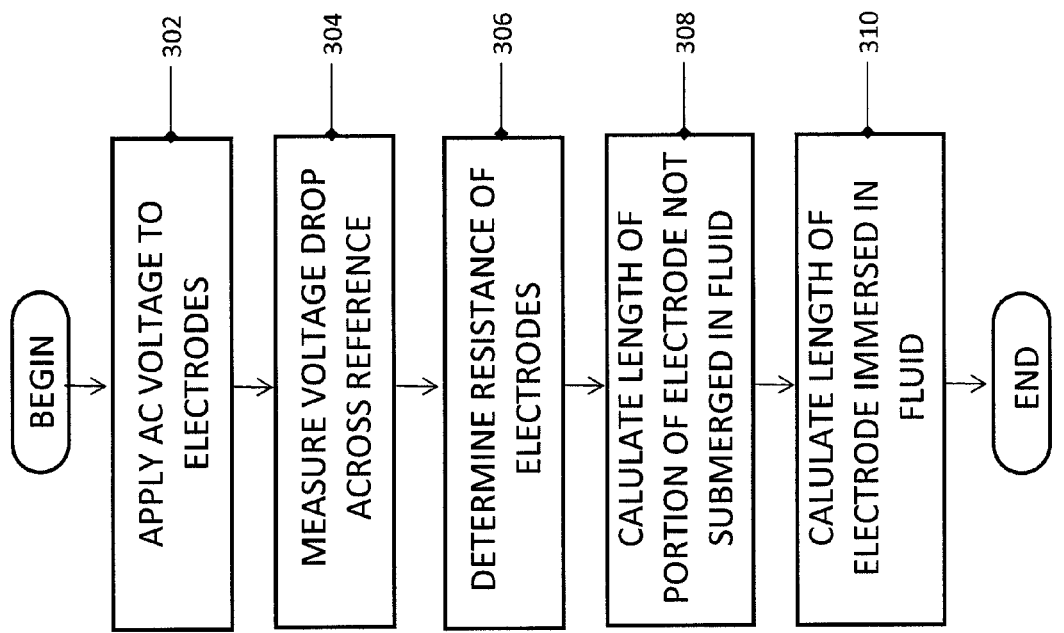
FIG. 3 illustrates a process for determining a conductive liquid level in a tank with the level sensor illustrated in FIG. 2.

FIG. 3 shows a flow chart 300 for determining the level of conductive liquid in a tank. Consistent with some embodiments of the present invention, in step 302 a predetermined AC excitation voltage from circuitry 122 is transmitted through sensor leads 216 and 218, passing through the portions of electrodes 212 and 214 that are not submerged in (or are uncovered by) conductive liquid 210 and through conductive liquid 210. In some embodiments consistent with the present invention, the voltage is generated at a predetermined magnitude and frequency. In step 304, the voltage drop across $R_{REF}$ is measured. In step 306, the resistance in sensor 120 is determined from the now known voltage and current. From the resistance, the length $L_U$ of electrodes 212 and 214 that is not submerged (or is uncovered) is determined in step 308. In step 310, the conductive liquid level in the tank 102 or 104 is determined from the length $L_U$.

Figure 4:
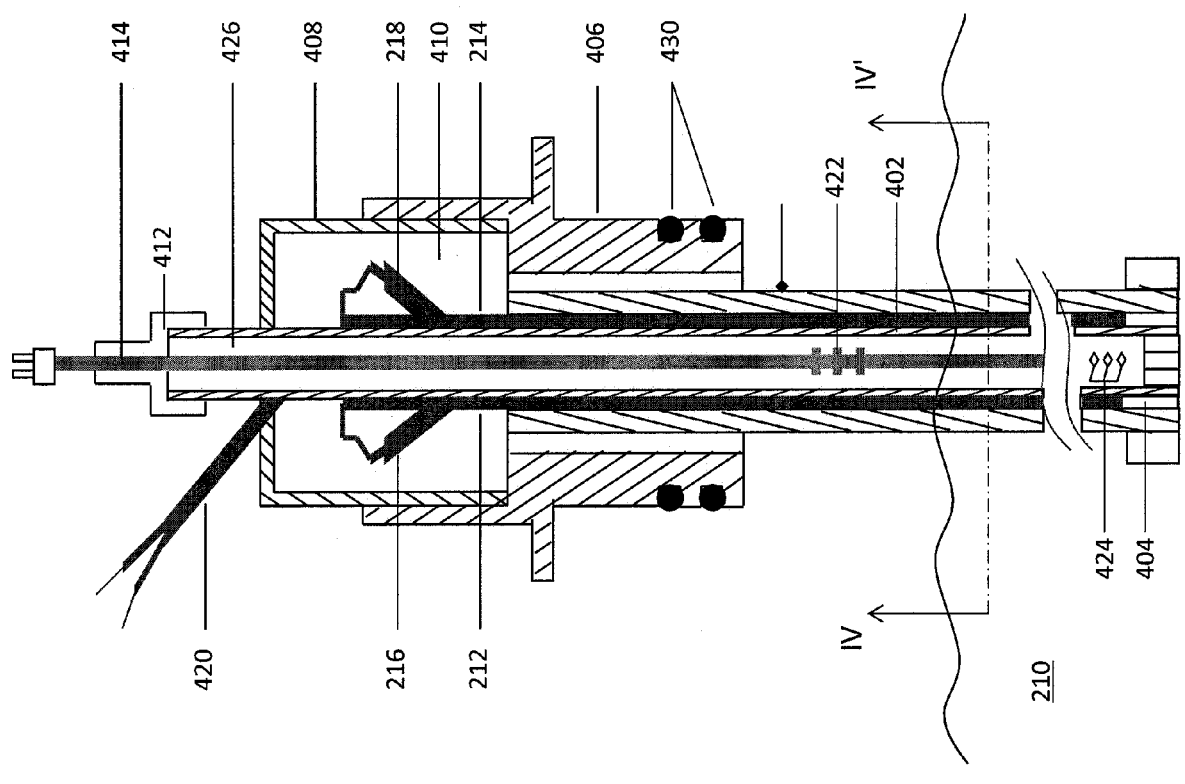
FIG. 4 illustrates a level sensor consistent with some embodiments of the present invention.

FIG. 4 shows an embodiment of sensor 120 consistent with the present invention. As shown in FIG. 4, electrodes 212 and 214 are inserted in gaps 404 between an outer structure 400 and an inner structure 402. Outer structure 400 and inner structure 402 may be concentric hollow cylinders (e.g., tubes or pipes), inner structure 402 having a diameter less than a diameter of outer structure 400 in order to accommodate electrodes 212 and 214. Moreover, as shown in FIG. 4, inner structure 402 may have a length greater than a length of outer structure 400, such that inner structure 402 extends beyond an end portion of outer structure 400.

Sensor 120 may also include adapter 406 coupled to an end portion of outer structure 400 so that sensor 120 can be mounted into a tank such as tank 102 or tank 104. In accordance with aspects of the present invention, adapter 406 may include a sealing unit 430 such as an O-ring. Further, sensor 120 may include a hollow cup 408 coupled to an end portion of adapter 406 that may be filled with potting material 410 to support inner structure 402 and provide a seal for sensor 120. In accordance with aspects of the present invention, potting material 410 may include resin, clay, putty, caulk, or other suitable materials. In other embodiments, end portion of adapter 406 may receive a pre-formed stopper with openings for the inner structure 402, electrode leads 216 and 218, etc. (not shown). Sensor 120 may further include an end adapter 412 coupled to an end portion of inner structure 402.

As shown in FIG. 4, electrodes 212 and 214 are coupled to electrode leads 216 and 218, respectively. Electrode leads 216 and 218 are coupled through sensor lead 420 to circuitry 122 (not shown). Accordingly, signals representative of measured properties of conductive liquid 210 may be transmitted via sensor lead 420 to circuitry 122. The signals received by circuitry 122 are then processed to determine measured properties, such as conductive liquid level, of conductive liquid 210. Circuitry 122 may also transmit signals to sensor 120, such as a predetermined current to electrodes 212 and 214.

As shown in FIG. 4, sensor 120 includes two sets of holes 422 and 424, which extend through outer structure 400 and through inner structure 402. In accordance with aspects of the present invention, holes 422 on an upper portion of sensor 120 may be gas vents, allowing gas to flow in and out of sensor 120. Holes 424 on a lower portion of sensor 120 may be conductive liquid vents 424, allowing conductive liquid 210 to flow in and out of sensor 120. As before, conductive liquid 210 provides a current path between electrode 212 and electrode 214 so that a measurement of the resistance between leads 216 and 218 provides a measurement of the length $L_U$ of electrodes 212 and 214 that is not submerged in (or are uncovered by) conductive liquid 210.

Sensor 120 may also include temperature sensor 414. As shown in FIG. 4, temperature sensor 414 extends through inner structure 402, and is supported and affixed within sensor 120 by end adaptor 412. Temperature sensor 414 may be a simple thermometer, a thermistor, a resistance temperature detector, a pyrometer, an infrared thermometer, or other such instrument capable of measuring a temperature of a fluid. Consistent with the present invention, fluid 210 may flow through fluid vents 424 into an interior portion 426 of inner structure 402, immersing a portion of temperature sensor 414, thereby allowing temperature sensor 414 to measure a temperature of fluid 210.

FIG. 5 shows a cross-sectional view of sensor 120 as shown in FIG. 4 taken along line IV-IV'. As shown in FIG. 5, electrodes 212 and 214 are affixed to an outer peripheral surface of inner structure 402 such that a surface of electrodes 212 and 214 is in gap 404. Conductive liquid 210 thus may flow through conductive liquid vents 324 to partially fill gap 404 and interior 426 with conductive liquid 210, partially immersing electrodes 212 and 214 and temperature sensor 414 in the conductive liquid. Consistent with embodiments of the present invention, inner structure 402 is machined to have slots 502 and 504 to receive electrodes 212 and 214, respectively. Slots 502 and 504 may thus secure electrodes 212 and 214 in sensor 120 without using adhesives or other fasteners. As a result, complete drainage of conductive liquid 210 from around electrodes 212 and 214 and temperature sensor 314 can be attained, which may provide a more accurate measurement of properties of fluids 210.

FIGS. 6A and 6B show an end portion 616 of electrodes 212 and 214, consistent with an embodiment of the present invention. As shown, wires 602, which couple end portion 616 to electrode leads 216 or 218, are attached to end portion 616 to provide electrical communication between electrodes 212 and 214 and circuitry 122. In accordance with aspects of the present invention, electrode lead wires 602 may comprise metal wires that are thermally pressed into the end portion 616 of electrodes 212 and 214. The metal wires may be made from any metal having good conductivity (e.g., gold, copper, and aluminum). In some embodiments, the bonding resistance (i.e., resistance arising from the connection between the metal wires and electrode), which contributes to resistance R0, can be reduced by utilizing multiple strands of wires individually bonded to end portion 616.

Referring back to FIG. 4, as discussed above, sensor 120 is utilized to measure the conductive liquid level of conductive liquid 210 by measuring the resistance through electrodes 212 and 214 and determining the length $L_U$ of electrodes 212 and 214 that is not submerged in (or are uncovered by) conductive liquid 210. The length $L_U$ is related to the conductive liquid level in a predetermined fashion because sensor 120 is rigidly fixed in tank 102 or 104. Embodiments that include temperature sensor 414 are also capable of providing the temperature of conductive liquid 210. In some embodiments, the measurement of length $L_U$ in this fashion may be temperature dependent. As a result, measuring the temperature of conductive liquid 210 with temperature sensor 414 allows controller 141 to adjust the determining of length $L_U$ with temperature.

Figure 7:
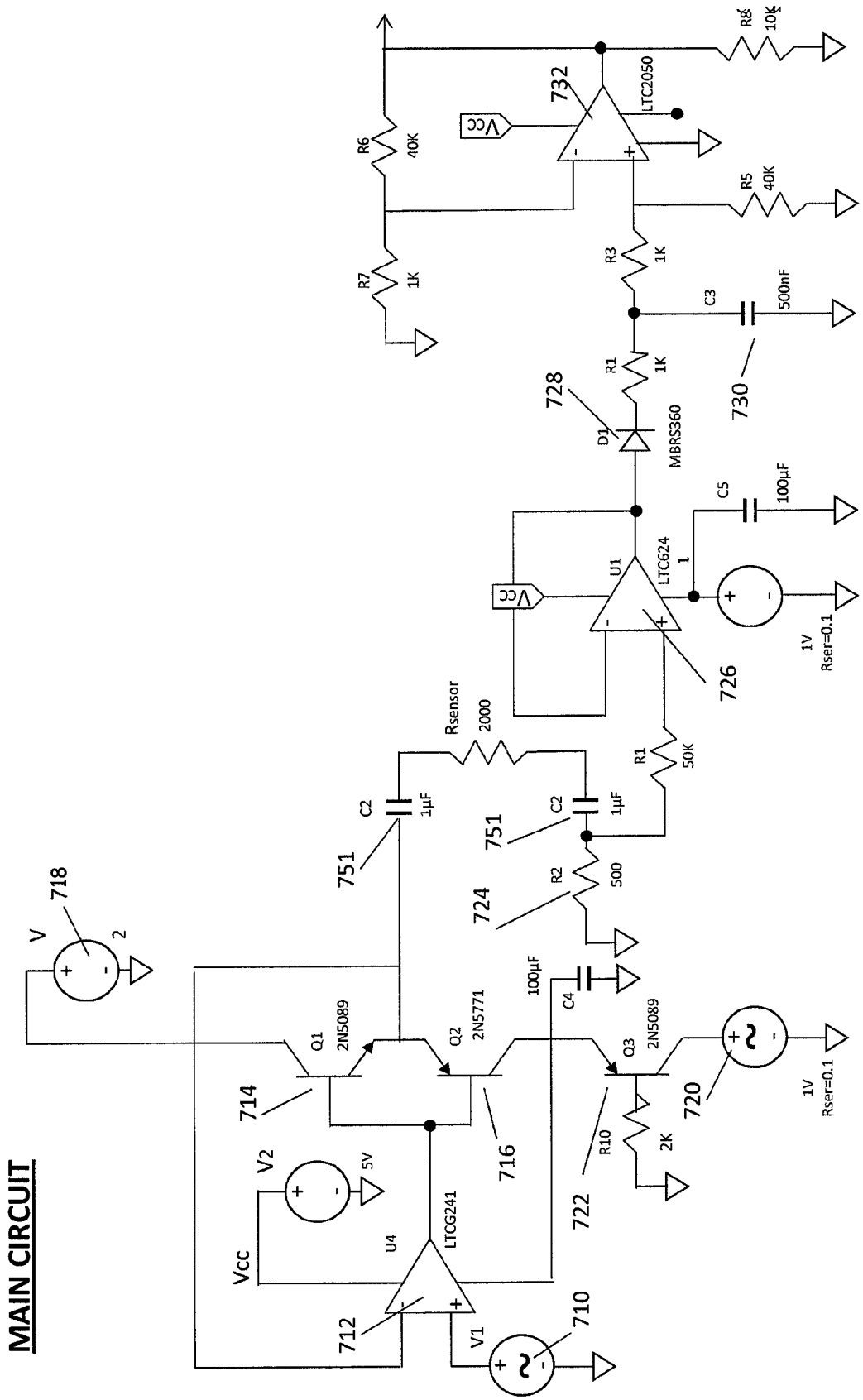
FIG. 7 illustrates a circuit that can be utilized to determine the conductive liquid level with the sensor shown in FIG. 4.

FIG. 7 illustrates an example of circuitry 122 that measures the level of conductive liquid utilizing a sensor 120 consistent with the present invention. In embodiments of circuitry 122, a predetermined AC excitation voltage of, for example, a 2 KHz frequency and 5V magnitude is passed through sensor 120 and a voltage across reference resistor 724 is measured. The voltage is then sent to a controller, where the level of conductive liquid 210 is determined based on the equation, $$V_m = \frac{R_{REF}}{R + R_{REF}} V_{AC}.$$

As such, an alternating voltage $V_{AC}$ is generated by an oscillator circuit 710. The output signal from oscillator 710 is coupled, through amplifier 712, to the gates of transistors 714 and 716. Transistors 714 and 716, along with charge pumps 718 and 720 and transistor 722, form a stable current source for sensor 120. As a result, an alternating current is supplied to the resistance of sensor 120.

Sensor 120 and reference resistor 724 form a voltage divider, the output of which is input to amplifier 726. The voltage is rectified and smoothed by diode 728 and capacitor 730 for input to amplifier 732. Amplifier 732 outputs a resulting output voltage, Vout, which correlates, as discussed above, with the level of conductive liquid measured by sensor 120.

Bypass capacitors 751 provide a DC isolation of the circuitry from the conductive liquid. In a flow battery, for example, the conductive liquid may be at a voltage of 50 V, whereas circuitry 122 operates at 5 V. Hence, circuitry 122 can be damaged without the bypass capacitors 751. Bypass capacitors 751 can preferably have a voltage rating higher than the voltage present in the conductive liquid. Also, the capacitance C of the bypass capacitors 751 can be such that they offer minimal impedance to the AC excitation. The impedance of a capacitor (Z in ohms) as a function of the excitation is given by $$Z = \frac{1}{2\pi f C},$$

where f is the frequency of the AC excitation. Z is typically much less than R (i.e., sensor resistance). In some embodiments Z<R/10. The bypass function can also be achieved by inductive coupling with, for example, pulse transformers.

As is shown in FIG. 1, battery system 100 includes two tanks 102 and 104, and therefore two sensors 120, one for each of tanks 102 and 104. The two sensors 120 may be coupled to a single circuit 122, or as shown in FIG. 1 they may each be coupled to independent circuitry 122. In either case, there is a potential for cross-talk between sensor 120 in tank 102 and sensor 120 in tank 104, because the electrolyte fluids 106 and 108 interact in battery cells 110. As a result, in some embodiments system 100 is arranged such that sensor 120 in tank 102 is decoupled from sensor 120 in tank 104. In some embodiments, this decoupling can be accomplished with an arrangement whereby only one sensor, either sensor 120 in tank 102 or sensor 120 in tank 104, is operating at a time. Circuit 122 switches between the two sensors to read one and then the other. In some embodiments, the decoupling can be arranged in other ways, for example by operating sensor 120 in tank 102 at a different frequency than sensor 120 in tank 104.

Accordingly, embodiments consistent with the present invention may provide a reliable and safe method for measuring the level of a conductive liquid in a system. More specifically, embodiments consistent with the present invention may provide a reliable method for measuring a level of electrolyte in a tank of a flow battery system. Furthermore, embodiments consistent with the present invention may also include a thermometer secured in the level sensors, allowing for a multi-functional sensor device capable of measuring a level or temperature of a conductive liquid.

It will be apparent to those skilled in the art that various modifications and variations can be made to the sensor for measuring multiple properties of a conductive liquid. Other embodiments consistent with the present invention will be apparent to those skilled in the art from consideration of the specification and practice of the invention disclosed herein. As those of ordinary skill in the art will readily appreciate, for example, an additional sensor or sensors may also comprise the sensor. For example, pressure, motion, and light sensors may be used in the sensor. It is intended that the specification and examples be considered as exemplary only. Accordingly, the invention should only be limited by the following claims.

What is claimed is:

1. A flow battery, comprising:
   a first holding tank for holding a first conductive electrolyte;
   a second holding tank for holding a second conductive electrolyte;
   at least one cell through which the first conductive electrolyte and the second conductive electrolyte are flowed;
   a first level sensor positioned in the first holding tank;
   a second level sensor positioned in the second holding tank and decoupled from the first level sensor, wherein said first and second level sensors are arranged such that there is no potential for cross-talk between the first and second level sensors; and circuitry coupled to the first level sensor and the second level sensor to alternatingly determine a liquid level in each of the first holding tank and the second holding tank, wherein the first level sensor and the second level sensor each comprise:
at least two electrodes, the two electrodes being positioned in the holding tank; and
sensor leads that couple the at least two electrodes to the circuit.

2. The battery of claim 1, wherein the circuitry provides an alternating current (AC) voltage to the electrodes of the first fluid level sensor and/or the second fluid level sensor.

3. The battery of claim 1, wherein the AC voltage is provided with a frequency greater than about 80 Hz and less than about 200 KHz.

4. The battery of claim 1, wherein the electrodes of the first fluid level sensor and the electrodes of the second fluid level sensor are capacitively or inductively isolated from the circuitry such that a voltage in the conductive liquid does not affect the circuitry.

5. The battery of claim 1, further comprising:
a first temperature sensor thermally coupled to the first conductive electrolyte in the first holding tank;
a second temperature sensor thermally coupled to the second conductive electrolyte in the second holding tank; and
a controller, wherein the controller is coupled to the first temperature sensor, the second temperature sensor and the circuitry and adjusts the determined liquid level based upon data from the first temperature sensor and/or the second temperature sensor.

6. The battery of claim 1, wherein the electrodes of the first level sensor and the electrodes of the second level sensor are formed from a material comprising carbon-loaded polyethylene, and are coupled to the sensor leads by a conductive wire coupled to end portions of the electrodes.

7. A flow battery, comprising:
at least one holding tank for holding a conductive electrolyte;
at least one cell through which the conductive electrolyte is flowed;
at least one liquid level sensor positioned in the tank, the at least one liquid level sensor comprising:
at least two electrodes that are immersed during use along an immersed portion of their length in the conductive electrolyte, the conductive electrolyte electrically coupling at least two electrodes along the immersed portion of their length;
a housing, the housing comprising:
a first adapter having a first end and a second end, the first end being coupled to an outer structure of the housing, and the second end being coupled to a hollow cup structure;
a potting material received by the hollow cup structure;
an end adapter coupled to an inner structure of the housing, the inner structure extending through the potting material; and
the outer structure and the inner structure, a gap being between the outer structure and the inner structure, the outer and inner structures comprising:
a first set of venting holes formed in a first portion of the outer and inner structures; and
a second set of venting holes formed in a second portion of the outer and inner structures, wherein:
the first set of venting holes allows the liquid to flow through the outer structure, the inner structure, and the gap; and
the second set of venting holes allows gas to flow through the outer structure, the inner structure, and the gap; and
a sensor circuit coupled to at least one liquid level sensor, wherein
the sensor circuit determines the length of the non-immersed portion of the immersed electrodes, wherein the length of the non-immersed portion of the immersed electrode is used by the sensor circuit to determine a liquid level in at least one holding tank.

8. The flow battery of claim 7, further comprising: at least two grooves formed on a peripheral surface of the inner structure along a length of the peripheral surface, wherein each of the at least two electrodes are formed to securely fit in one of the at least two grooves.

9. The battery of claim 7, wherein a resistance per unit length of one or more of the electrodes is greater than a resistance per unit depth of the conductive liquid.

10. The battery of claim 7, wherein the sensor circuit provides an alternating current (AC) voltage to the at least two electrodes.

11. The battery of claim 10, wherein the AC voltage is provided with a frequency greater than about 80 Hz and less than about 200 KHz.

12. The battery of claim 10, wherein the length of the non-immersed portion of the immersed electrodes is calculated from a measured current of the immersed electrodes during use.

13. The battery of claim 10, wherein the immersed electrodes are capacitively or inductively isolated from the sensor circuit such that a voltage in the conductive electrolyte does not affect the circuitry.

14. The battery of claim 10, further comprising:
at least one temperature sensor thermally coupled to the conductive electrolyte; and
a controller, wherein the controller is coupled to the at least one temperature sensor and the sensor circuit and adjusts the calculation of the level of the conductive electrolyte based upon a temperature sensed by at least one temperature sensor.

15. The battery of claim 7, further comprising a temperature sensor extending through the inner structure and being coupled to the end adapter.

16. The battery of claim 7, wherein at least one of the electrodes is formed from a material comprising carbon-loaded polyethylene, and is coupled to sensor leads by a conductive wire coupled to end portions of the electrode.

17. A battery, comprising:
a first holding tank adapted to hold a first conductive electrolyte;
a second holding tank adapted to hold a second conductive electrolyte;
at least one cell through which the first and second conductive electrolytes are flowed;
a first level sensor positioned in the first holding tank;
a second level sensor positioned in the second holding tank and decoupled from the first level sensor such that there is no potential for cross-talk between the second level sensor and the first level sensor; and
circuitry coupled to the first level sensor and the second level sensor, said circuitry being adapted to facilitate determining a liquid level in each of the first and second holding tanks.

18. The battery of claim 17, wherein said second level sensor operates at a frequency that is different than the operating frequency of said first level sensor.

19. The battery of claim 17, wherein said circuitry is arranged to read only one of said first and second level sensors at a time.

20. The battery of claim 17, wherein said circuitry comprises a single circuit.

21. The battery of claim 17, wherein at least one of said first level sensor and said second level sensor includes a plurality of electrodes.

22. The battery of claim 21, wherein at least one of said plurality of electrodes is partially immersed in one of said first and second electrolytes.

23. The battery of claim 22, wherein a resistance per unit length of said at least one electrode is greater than a resistance per unit depth of its respective first or second electrolyte.

24. The battery of claim 22, wherein the length of the non-immersed portion of the immersed electrode is used to determine the liquid level for the one of said first and second electrolytes.

25. The battery of claim 17, wherein at least one of said plurality of electrodes is formed from a material comprising carbon-loaded polyethylene.

26. The battery of claim 17, further comprising:
at least one temperature sensor thermally coupled to at least one of said first and second holding tanks and adapted to provide data to facilitate the determining of the liquid level in the at least one of said first and second holding tanks.

* * * * *